Feb. 6, 1934.  H. G. WEYMOUTH  1,946,342
METER HANGER
Filed April 3, 1929   3 Sheets-Sheet 3
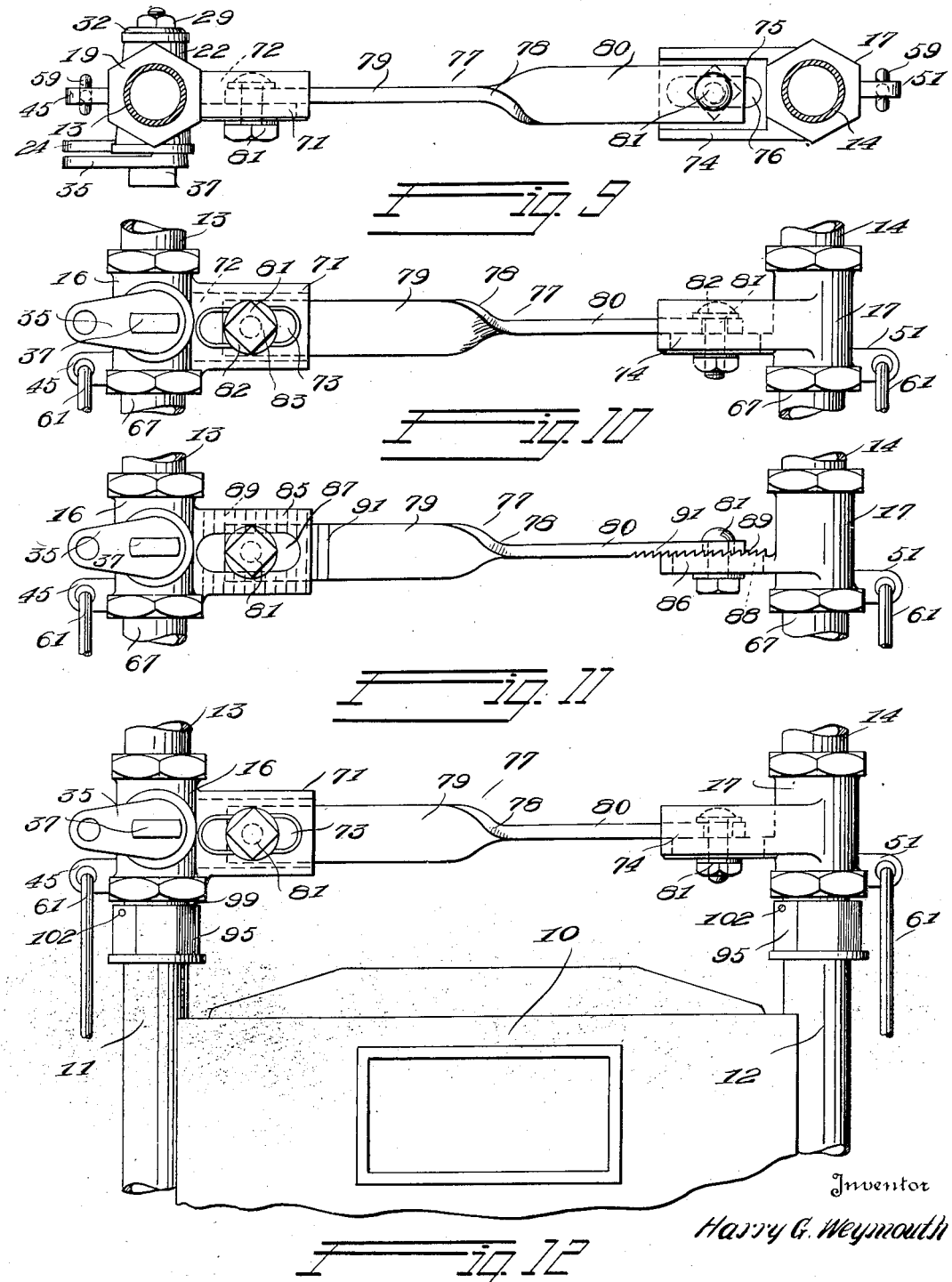
Inventor
Harry G. Weymouth
By
Strauch & Hoffman
Attorneys Patented Feb. 6, 1934

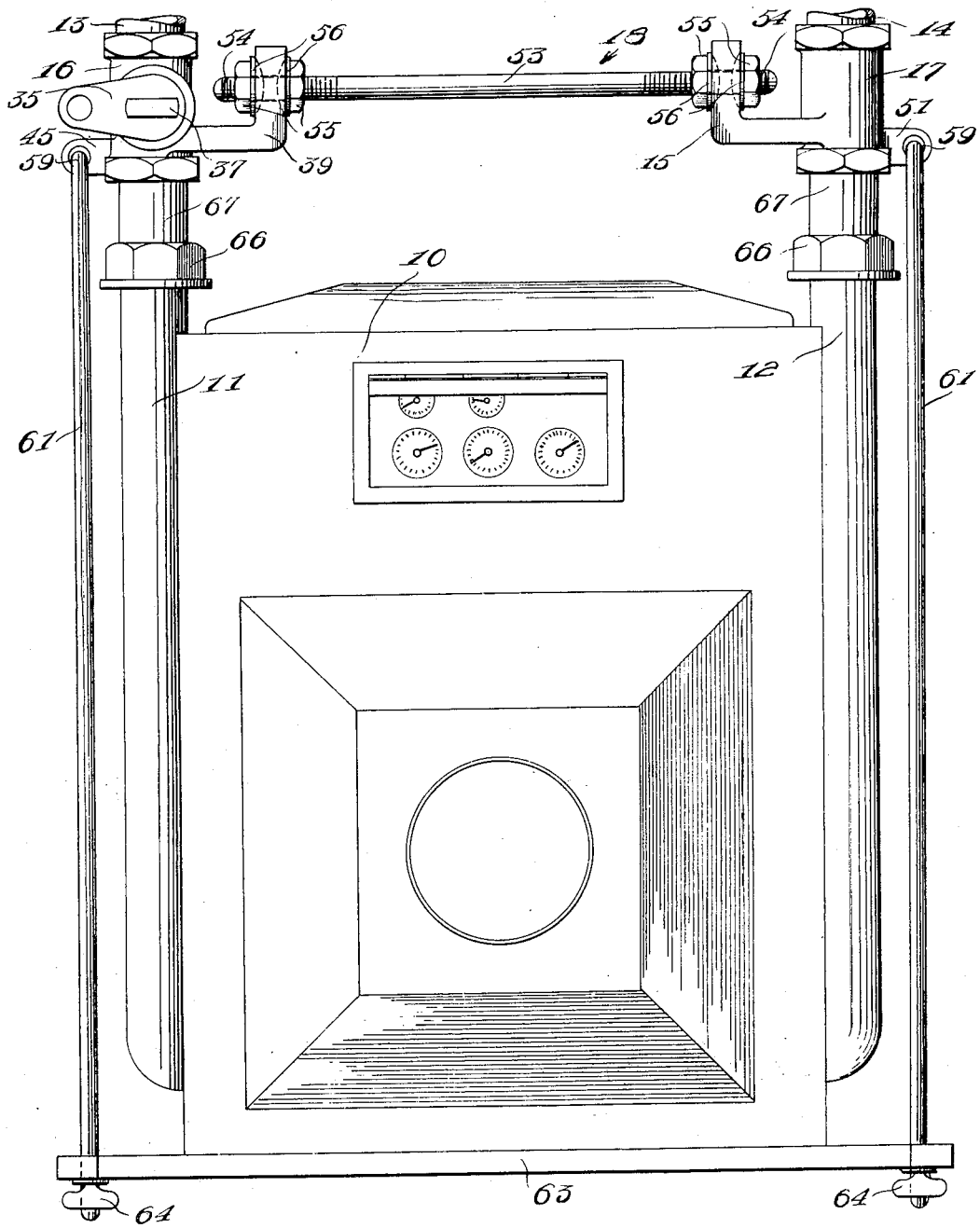

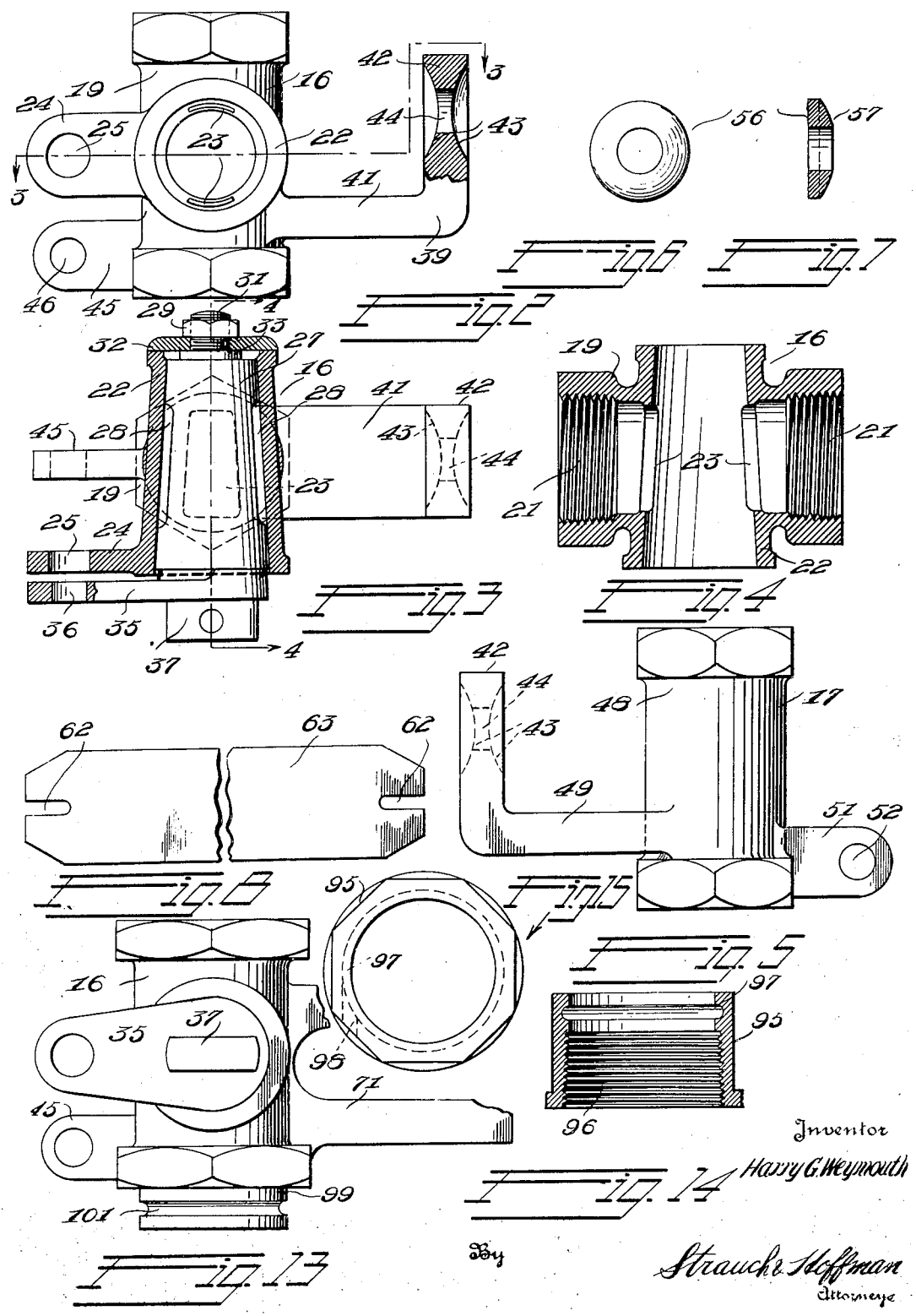

1,946,342

UNITED STATES PATENT OFFICE 1,946,342

METER HANGER

Harry G. Weymouth, Pittsburgh, Pa., assignor to Pittsburgh Equitable Meter Company, Pittsburgh, Pa., a corporation of Pennsylvania Application April 3, 1929. Serial No. 352,284

9 Claims. (Cl. 285—3)

This invention relates to meter hangers.

More specifically, the invention relates to hangers for supporting meters such as gas meters, and for connecting the inlet and outlet terminals of such meters with the house and service gas pipes in such a way as to relieve the meter terminals of strain.

Gas meters now in use are generally constructed of sheet metal, the parts of which are soldered together by hand with the inlet and outlet terminals in the form of tubular members that are soldered to opposite sides of the meter proper.

Since the meters are constructed in this manner, they are frequently not exactly the same size and the inlet and outlet terminals are not always spaced apart exactly the same distance. Furthermore because of the soldered connections this construction of meter will not withstand substantial strains on the inlet and outlet terminals without rupturing or weakening the same.

While the adjacent ends of the house or service pipes are brought in approximately the correct position by the mechanic when installing the pipes for the connection of a meter therewith, it is impractical to accurately position them for connection without introduction of strains on the inlet and outlet terminals of all gas meters, due to the slight variations in different meters and, because of the fact that the inlets and outlets of the meters are not always in precisely the same relative position. It is well known, further, that mechanics bring the ends of the house or service pipes only in approximately the correct position. Accordingly non-alinement between the meter inlet and outlet terminals and the house or service pipes for the causes specified is quite common. If meters are installed and the improper alinement corrected by utilizing the meter to hold the service pipes in position strains are imposed on the soldered connections that cause disruption or weakening thereof. Furthermore, it is desirable to avoid strains on the meter connection by transmitting the weight of the meter to the service pipes substantially independently of the meter inlet and outlet connections.

It is a primary object of this invention to provide a meter hanger for effecting ready connection of a gas meter with the house and service pipes without causing strains in the meter inlet and outlet terminals, either because of improper alinement of said terminals with the service pipes and because the weight of the meter is supported by said inlet or outlet together, or by either inlet or outlet separately.

It is a further object of this invention to provide a meter hanger embodying means for detachably connecting the inlet and outlet terminals of a gas meter with the house and service pipes, and adjustable means for accurately alining said first means with said meter inlet and outlet terminals and to at the same time permit the attachment of the meter support so that the weigh thereof is supported by said hanger without strain on the inlet or outlet connection.

A still further object of the invention is to provide a meter hanger including an interconnection between the service pipe terminals that will permit free relative movement of said terminals in a plurality of directions during their adjustment, which interconnection is so arranged that after the adjustment has been made, the terminals may be secured rigidly in proper relative fixed position by a simple manipulation of clamping means.

With these objects in view as well as others that will become apparent in the course of the following disclosures, reference will be had to the accompanying drawings forming part of same, and in which:

Figure 1 is a front elevational view of a gas meter connected with the house and service pipes by one form of hanger embodied in my invention.

Figure 2 is a side elevational view partly broken away and in section of the inlet connector of the form of invention illustrated in Figure 1.

Figure 3 is a horizontal sectional view taken on broken line 3—3 in Figure 2, disclosing the valve in plan in operative association with the inlet connector.

Figure 4 is a vertical sectional view on line 4—4 in Figure 3.

Figure 5 is a side elevational view of the outlet connector of the form of invention illustrated in Figure 1.

Figure 6 is an end view of one of a plurality of washers embodied in this form of my invention.

Figure 7 is a diametrical sectional view of the washer illustrated in Figure 6.

Figure 8 is a broken plan view of the meter support.

Figure 9 is a top plan view of a modified form of hanger with the house and service pipes in transverse section.

Figure 10 is a side elevational view of the construction illustrated in Figure 9.

Figure 11 is a side elevational view of a still further modified form of hanger.

Figure 12 is a side elevational view of the form of hanger illustrated in Figures 9 and 10 disclosing a modified form of connection between the inlet and outlet terminals and the meter and the connectors, a portion of a meter being illustrated in front elevation.

Figure 13 is a broken side elevational view of the inlet connector illustrated in Figure 12.

Figure 14 is a central vertical sectional view of a coupling member embodied in this form of the invention.

Figure 15 is a top plan view of the coupling member illustrated in Figure 14.

Referring to the drawings by reference characters in which like characters designate like parts, and referring first to Figures 1 to 8 inclusive, 10 (Figure 1) designates a gas meter provided with the inlet and outlet terminals 11 and 12 respectively. The numerals 13 and 14 respectively designate the ends or terminals of service or house pipes to which the meter inlet and outlet terminals 11 and 12 are detachably connected for the flow of gas through the meter. The connection of terminals 11 and 12 with pipes 13 and 14 is effected by a hanger construction designated as a whole by the reference character 15 in Figure 1.

Hanger 15, shown in assembled and applied position in Figure 1, with the details illustrated in Figures 2 to 7 inclusive, comprises an inlet connector 16, an outlet connector 17 and an adjustable tie bar connection 18 between connectors 16 and 17. Connector 16, illustrated in detail in Figures 2, 3 and 4, comprises a cylindrical member 19 having the opposite ends thereof internally threaded as indicated at 21 for a purpose later described, and a frusto-conical valve casing 22 intersecting member 19 intermediate the ends thereof and in communication therewith through diametrically disposed elongated ports 23. Casing 22 is provided with an integral arm 24 provided with an aperture 25. Rotatably mounted in valve casing 22 is a hollow valve member 27 provided with diametrically disposed ports 28 opening through said member into the chamber or hollow interior thereof.

Valve member 27 is maintained in engagement with casing 22 by a nut 29 adjustably threaded on an extension 31 of valve 27 in engagement with a washer 32 engaging the smaller end of casing 22 and receiving a cylindrical extension 33 of valve 27 with which extension threaded extension 31 is integrally connected. Valve member 27 on the opposite or larger end thereof is provided with an integral arm 35 provided with an aperture 36 and outwardly of arm 35 valve 27 is provided with a wrench receiving flattened extension 37 for effecting rotation of valve 27 within casing 22.

As illustrated in Figure 3, arms 24 and 35 as well as the respective apertures 25 and 36 are alined in the closed position of valve 27 whereby a sealing wire or other locking means may be inserted in alined apertures 24 and 36, for preventing unauthorized movement of valve 27 when the gas supply has been shut off. It will be seen from Figure 3 that upon a 90 degree movement of valve 27 ports 23 and 28 will aline thus establishing direct communication through member 19 for effecting flow of gas from the service pipe 13.

Connector 16 is provided with an integral angular extension 39 comprising a horizontal portion 41 and a vertical portion 42 which latter portion is provided on opposite faces thereof with axially alined spherical faced recesses 43 intercommunicating through a hole 44 formed in portion 42 co-axial with recesses 43. Connector 16 is further provided with a laterally extending integral ear 45 provided with an aperture 46 for a purpose later described.

The outlet connector 17 comprises an uninterrupted cylindrical member 48 internally threaded at opposite ends thereof similar to member 19. Member 48 is provided with a lateral extension 49 of the same configuration as extension 39 and provided with like recesses 43 and intercommunicating hole 44. Said member is further provided with an ear 51 similar to ear 45 and apertured at 52.

The tie bar connection 18 comprises a rod 53 threaded at the opposite ends thereof as indicated at 54. Each end of said rod extends in its operative position through one of the holes 44, and has threaded thereon nuts 55, one positioned on each opposite face of vertical portion 42 of the respective angular extension 39 or 49. Slidably mounted on rod 53 for cooperation with each of the recesses 43 is a washer 56 provided with a spherical faced surface 57 for seating engagement with the base of recess 43, the washers 56 being interposed between nuts 55 and portion 42 on rod 53 at each end thereof.

The oppositely extending ears 45 and 51 of the respective connectors 16 and 17 support through the apertures 46 and 52 therein, upper hooked ends 59 of rods 61, which, in applied position, extend parallel with the meter terminals 11 and 12. The lower threaded ends of said rods project through slots 62 in the opposite ends of a meter support 63. Thumb nuts 64 are threaded on the ends of rods 61 to vary the effective length thereof.

In assembling a meter with the service and house pipes 13 and 14 respectively, the inlet and outlet connectors 16 and 17 respectively are separately connected with pipes 13 and 14 by threading the ends of the pipes into the outer threaded ends 21 of connectors 16 and 17.

Upon connecting connectors 16 and 17 with pipes 13 and 14, extensions 39 and 49 are directed toward each other, as illustrated in Figure 1, after which rod 53 with the inner or adjacent nuts 55 and washers 56 assembled thereon is connected with extensions 39 and 49 by projecting the opposite ends thereof through holes 44 which is accomplished by turning inner nuts 55 toward each other on rod 53 after which the outer washers 56 and nuts 55 are applied on the opposite threaded ends 54 of rod 53. Rods 61 are then connected with ears 45 and 51 and engaged at the inner ends thereof with the meter support 63 through slots 62 therein and nuts 64 applied to the inner threaded ends of rods 61. Meter 10 is now supported on the support 63 the terminals 11 and 12 of which are provided with the usual unions 66 and nipples 67 the outer ends of which nipples are externally threaded for screw threaded engagement with the inner threaded ends 21 of connectors 16 and 17. With the meter supported in this position it is then only necessary to connect nipples 67 with connectors 16 and 17 for effecting complete installation of the meter, but in order to connect nipples 67 with connectors 16 and 17 without causing strains in terminals 11 and 12 the connectors 16 and 17 will have to be accurately alined with nipples 67 before making the connection. In order to secure this result, nuts 55 are adjusted on rod 53 to bring connectors 16 and 17 into exact alinement with nipples 67 by adjustment of nuts 55. The spherical faced washers 56 in recesses 43 enable the connectors 16 and 17 to be moved in a plurality of directions without setting up twisting strains in rod 53 that would resist and otherwise prevent the relative adjustment and accurate relative location of said connectors, the rod 53 passing loosely enough through apertures 44 so as to allow said rod to assume various slightly angularly disposed positions with respect to a line that accurately coincides with the axis of said apertures or either of them. After the connectors are brought into the exact position necessary to permit union of said connectors with nipples 67 without lateral strain on the inlet or outlet connections of the meter the relative position of said connectors is fixed by tightly adjusting all of the nuts 55. As the connection thus provided has not been subjected to twisting strains, though the connectors may have been moved in a plurality of directions, when the nuts 55 are tightened the connectors 16 and 17 have no tendency to move relative to each other because of such strain. The nipples 67 are then manipulated to complete the connection without imposing stresses on the meter outlet or inlet. After connecting nipples 67 with connectors 16 and 17 nuts 64 are drawn up for bringing support 63 into firm contact with the base of meter 10 transmitting the weight of the meter substantially entirely to the connectors 16 and 17. As said connectors have no inherent tendency to change their position because of twisting forces in their interconnection, said connectors tend to remain in their adjusted position in which they are rigidly maintained by said interconnection.

By the provision of the spherical faced recesses 43 in extensions 39 and 49 and the cooperating washers 56 it will accordingly be seen that connectors 16 and 17 prior to tightening nuts 55 may be moved in various angular directions for effecting alinement between terminals 11 and 12 and connectors 16 and 17, after which nuts 55 are tightened thus holding connectors 16 and 17 in accurate position for connection of nipples 67 therewith whereby meter 10 is connected with the service and house pipes 13 and 14 respectively without causing strain in the soldered meter terminals 11 and 12 or other portions of the meter. Furthermore, by supporting meter 10 on support 63 which is suspended through rods 61 from connectors 16 and 17 no substantial longitudinal strain is exerted on terminals 11 and 12 or the connections between the terminals and connectors 16 and 17.

A modified form of hanger is illustrated in Figures 9 and 10 wherein connector 16 is provided with a relatively wide vertically disposed integral extension 71 provided with a laterally facing guide channel 72 having a longitudinally extending slot 73 in the base thereof. Connector 17 is provided with an extension 74 similar to extension 71 but disposed at right angles thereto and provided with a channel 75 having an elongated longitudinally extending slot 76 in the base thereof. Extensions 71 and 74 are adjustably connected by means of a relatively wide flat rigid tie bar 77 which is twisted intermediate the ends thereof as indicated at 78 for providing opposite end portions 79 and 80 at right angles to each other, the portion 79 being adapted to rest in channel 72 and the portion 80 being adapted to rest in channel 75. The opposite ends of bar 77 are adjustably connected with extensions 71 and 74 by means of bolts 81 extending through apertures in the ends of bar 77 and projecting through the respective slots 73 and 76, washers 82 being applied to bolts 81 inward of nuts 83 for bearing engagement with the edges of the slots.

In accordance with this form of the invention the opposite connectors 16 and 17 may be readily adjusted relative to each other for effecting alinement with the meter terminals as the elongated slots 73 and 76 permit lateral adjustment between connectors 16 and 17 and due to the right angularly disposed pivotal connections afforded by bolts 81 carried by the opposite right angularly disposed portions 79 and 80 of bar 77 relative adjustment in a plurality of directions between connector 16 and 17 is permitted without setting up twisting strains in bar 77 as in the form of the invention above described. Said adjustment is maintained upon tightening nuts 83 on bolts 81.

In Figure 11 a still further modified form of the invention is disclosed wherein connectors 16 and 17 are provided with flat right angularly disposed extensions 85 and 86 respectively provided with longitudinally disposed slots 87 and 88. Extensions 85 and 86 are each provided with a toothed surface 89 for engagement by cooperating toothed surfaces 91 on the opposite ends of the angular tie bar 77.

In accordance with this form of the invention connectors 16 and 17 may be readily adjusted in a lateral direction and upon tightening nuts 83 after proper adjustment the engaging teeth will prevent movement of connectors 16 and 17 from their adjusted positions.

In Figures 12 to 15 inclusive is illustrated a still further modification of the invention wherein unions 66 and nipples 67, are replaced by connecting means for effecting connection between meter terminals 11 and 12 and connectors 16 and 17 without inducing twisting or torsional strains on terminals 11 and 12 during the making of the connection. The connecting means comprises a nut 95 internally threaded at the inner end thereof as indicated at 96 for screw threaded connection with the outer end of each of the terminals 11 and 12. The outer end of nut 95 is provided with an internal circumferential channel 97 substantially semicircular in cross section and nut 95 is provided with a hole 98 opening through a side thereof and communicating with channel 97 as indicated in Figure 15. The inner end of each of the connectors 16 and 17 is provided with a cylindrical extension 99 of an external diameter equal to the internal diameter of the outer end of nut 95 and extension 99 is provided with an external circumferential channel 101 substantially semi-circular in cross section.

A key wire 102 is driven into hole 98 of each of the nuts 95, the wire being of sufficient length as to completely encircle the circular channel defined by cooperating channels 97 and 101 whereby a gas tight swivelled connection is provided between connectors 16 and 17 and nuts 95.

It will be understood that by connecting the meter terminals utilizing the connectors just described no twisting or torsional strains are imparted to the connectors 16 or 17, tending to displace them as might be the case in tightening up unions 66 and nipples 67 in the previous forms of the invention.

While the key wire connection is illustrated in combination with the angular tie bar connection 77 in Figure 12, it will be obvious that this form of meter terminal connection is equally applicable to the forms of tie bar connection illustrated in Figures 1 and 11.

From the foregoing disclosure it will be seen that meter hanger constructions are provided which are relatively simple in construction, inexpensive of manufacture and by the use of which meters can be expeditiously installed without injury to the meter terminal connections.

While I have disclosed certain specific embodiments of my invention they are to be considered as illustrative only and not restrictive since the scope of the invention is defined in the subjoined claims.

What I claim and desire to secure by U. S. Letters Patent is:

1. A meter hanger comprising a pair of connectors for detachable connection with the service and house pipes and the inlet and outlet terminal pipes of a gas meter; said connectors having aligned lateral extensions provided with holes; a rod extending across said connectors and passing directly through said holes; and means comprising nuts threaded on said rod adapted to be clamped against said extensions for rigidly securing said rod to said extensions in various angular and longitudinal positions relative to said connectors.

2. A meter hanger comprising inlet and outlet connectors for detachable connection of the service or house pipes with the inlet and outlet terminals of a meter; longitudinally aligned extensions integral with said connectors and comprising vertically disposed portions; said portions provided with apertures therethrough and spherical faced recesses in opposite faces thereof communicating with said apertures; a terminally threaded rod projecting through said apertures and provided with a pair of spherical washers for engagement with said spherical faced recesses in each of said vertical portions; and nuts threadedly engaged with said threaded terminals of said rod for drawing said washers into engagement with said recesses.

3. A meter hanger comprising inlet and outlet connectors for detachable connection of the service or house pipes with the inlet and outlet terminals of a meter; extensions projecting from said connectors with openings therein, said extensions being positioned between said connectors and lying substantially in a vertical plane passing through said connectors a tie bar having the opposite ends thereof in contact with said extensions; angularly adjustable connections between said opposite ends of said bar and said extensions arranged to permit relative adjustment of said tie bar with respect to said extensions in a plurality of directions.

4. The combination defined in claim 3 in which said tie bar comprises a relatively rigid, wide, flat bar twisted intermediate the ends thereof for providing right angularly disposed portions for cooperation with said extensions.

5. The combination defined in claim 3 in which said extensions and said tie bar are provided with cooperating means for positively holding same in relative adjusted position.

6. A meter hanger comprising inlet and outlet connectors for detachable connection with the inlet and outlet terminals of a meter and the service pipes, aligned lateral extensions on said connectors and provided with openings therethrough, a rod projecting through the openings of said extensions, lock nuts threaded on the ends of said rod projecting through said extensions, and tiltable means interposed between said lock nuts end said extensions for allowing universal adjustment of said rod with respect to said extensions.

7. A meter hanger comprising two connectors adapted to connect the service pipes with the meter, aligned lateral extensions on said connectors having openings therein and spherical faced recesses in surfaces on said extensions on opposite sides of said openings, a tie rod extending through said openings, and means adjustable lengthwise of said tie rod and having cooperating spherical faces for engaging the spherical faced recesses on said extensions whereby said tie rod may be rigidly clamped to said extensions in varying angular positions.

8. A meter hanger comprising inlet and outlet connectors for detachable connection of the service or house pipes with the inlet and outlet terminals of a meter; aligned lateral extensions projecting from said connector with elongated slots therein, the portions of one extension having the slot being in a different plane than the corresponding portion of the other extension; a tie bar; and bolts carried by the opposite ends of said bar projecting through said slots to permit angular adjustment between said connectors and said bar.

9. A meter hanger comprising a pair of connectors for detachable connection with the service and house pipes and the inlet and outlet terminal pipes of a gas meter; said connectors having aligned lateral extensions provided with holes therein countersunk on both sides to provide recesses; a rod extending across said connectors and passing directly through said holes; and means comprising washers shaped to correspond with the countersinking and nuts threaded on said rod and adapted to be clamped against said washers for rigidly securing said rod to said extensions in various angular and longitudinal positions relative to said connectors.

HARRY G. WEYMOUTH.